Figure 1:
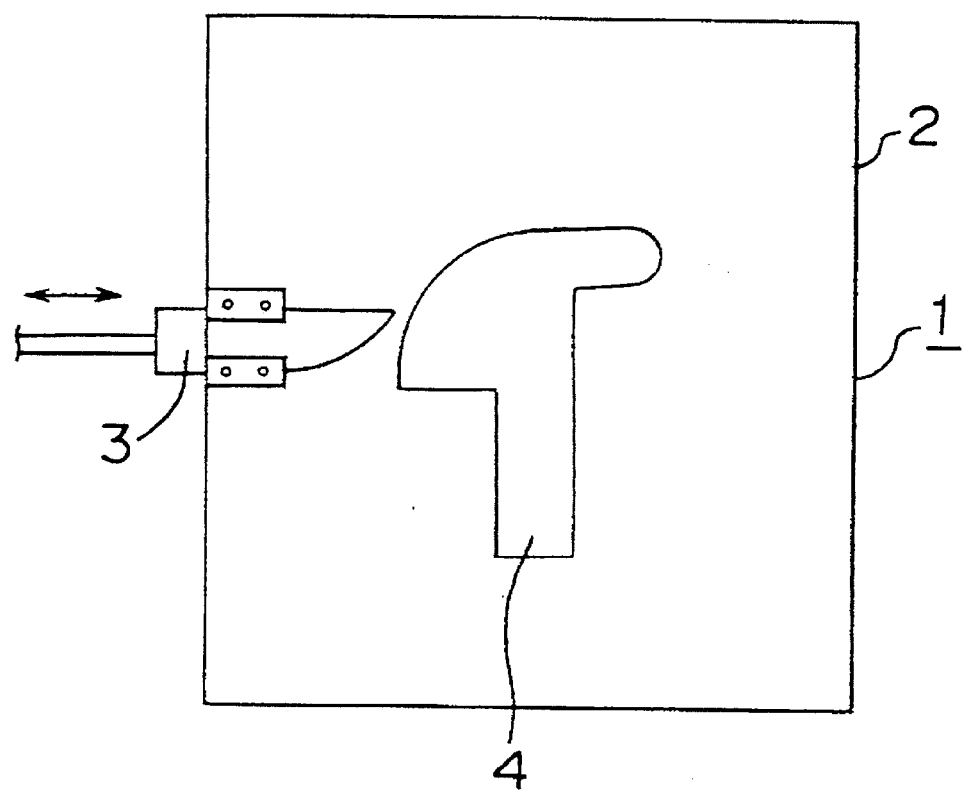

United States Patent [19]

Ichikawa

[11] Patent Number: 5,658,980
[45] Date of Patent: Aug. 19, 1997

[54] VINYL CHLORIDE RESIN COMPOSITION

[75] Inventor: Naoki Ichikawa, Nagoya, Japan

[73] Assignee: Mitsubishi Chemical MKV Company, Tokyo, Japan

[21] Appl. No.: 550,230

[22] Filed: Oct. 30, 1995

[30] Foreign Application Priority Data

Nov. 8, 1994 [JP] Japan ................ 6-273603

[51] Int. Cl.$^6$ .......................................... C08J 3/00
[52] U.S. Cl. ................................. 524/523; 524/569
[58] Field of Search ........................ 524/523, 569

[56] References Cited

U.S. PATENT DOCUMENTS 3,954,928 5/1976 Omori et al. ................ 264/51
4,894,281 1/1990 Yagi et al. ................ 428/286
5,298,334 3/1994 Moriyama et al. ................ 428/474.4

FOREIGN PATENT DOCUMENTS 59-114040 6/1984 Japan .
4-159154 6/1992 Japan .
6-134835 5/1994 Japan .

Primary Examiner—Peter D. Mulcahy
Attorney, Agent, or Firm—Oblon, Spivak, McClelland, Maier & Neustadt, P.C.

[57] ABSTRACT

A vinyl chloride resin composition to be used for extrusion molding whereby the cross-sectional shape of a molded product is continuously changed, said composition comprising 100 parts by weight of a vinyl chloride homopolymer, from 20 to 200 parts by weight of a plasticizer, and from 5 to 30 parts by weight of an acrylic resin having a weight average molecular weight of at least 1,500,000 and having a maximum draft ratio (i.e. when the vinyl chloride resin composition is extruded from an orifice having a diameter of 1 mm and a length of 20 mm at a cylinder temperature of 170° C. at a shear rate of $1.2 \times 10^2 s^{-1}$, and the extruded filamentous composition is taken off at an increasing speed, a ratio of the take-off speed to the extrusion speed immediately before breakage of the filamentous composition) of at least 7.

7 Claims, 1 Drawing Sheet

VINYL CHLORIDE RESIN COMPOSITION

The present invention relates to a vinyl chloride resin composition useful for extrusion molding whereby the cross-sectional shape of a molded product is gradually changed.

Japanese Unexamined Patent Publications No. 114040/1984 and No. 159154/1992 disclose an extrusion molding technique, whereby the cross-sectional shape in the longitudinal direction of a long molded product is continuously changed, like molding for automobiles. Such extrusion molding is designed to extrude and coat a synthetic rubber or a synthetic resin on a part or the entirety of a metal strip, so that the cross-sectional shape of the coated material is continuously changed. With a coating material such as a synthetic rubber or a synthetic resin, it is necessary to select the physical properties depending upon the cross-sectional shape. For example, Japanese Unexamined Patent Publication No. 134835/1994 discloses a vinyl chloride alkyl ester or an α-olefin copolymer as a resin material for extrusion molding whereby the cross-sectional shape is continuously changed. However, it can hardly be said that the above material for extrusion molding has adequately been studied.

The present inventors have conducted an extensive research for a resin material which can be molded by extrusion in a shape corresponding to the shape of the opening of the extrusion die even when the shape of the opening changes continuously, and as a result, have found that by adding a certain specific amount of an acrylic resin having a relatively high molecular weight to a soft vinyl chloride resin composition containing a vinyl chloride homopolymer as the resin component, the resulting composition has an excellent extrusion shape-following property and is free from so-called local elongation or tearing of the composition at the time of extrusion, whereby extrusion molding can be easily carried out. The present invention has been accomplished on the basis of this discovery.

Namely, it is an object of the present invention to provide a vinyl chloride resin composition which has an excellent shape-following property when used for extrusion molding whereby the cross-sectional shape of a molded product is continuously changed.

The present invention provides a vinyl chloride resin composition to be used for extrusion molding whereby the cross-sectional shape of a molded product is continuously changed, said composition comprising 100 parts by weight of a vinyl chloride homopolymer, from 20 to 200 parts by weight of a plasticizer, and from 5 to 30 parts by weight of an acrylic resin having a weight average molecular weight of at least 1,500,000 and having a maximum draft ratio (i.e. when the vinyl chloride resin composition is extruded from an orifice having a diameter of 1 mm and a length of 20 mm at a cylinder temperature of 170° C. at a shear rate of $1.2 \times 10^{2 s-1}$, and the extruded filamentous composition is taken off at an increasing speed, a ratio of the take-off speed to the extrusion speed immediately before breakage of the filamentous composition) of at least 7.

In the accompanying drawing, FIG. 1 is a front view of an extrusion die.

Now, the present invention will be described in detail with reference to the preferred embodiments.

The vinyl chloride homopolymer as the main resin component for the vinyl chloride resin composition of the present invention may be produced by any method for polymerization of vinyl chloride such as suspension polymerization, bulk polymerization, micro suspension polymerization or emulsion polymerization. The average degree of polymerization of the vinyl chloride homopolymer is not particularly limited, but it is usually within a range of from 700 to 8,000, preferably from 1,000 to 4,000, more preferably from 1,100 to 2,500, in view of the processability and the moldability.

The plasticizer to be used for the vinyl chloride resin composition of the present invention is not particularly limited so long as it is commonly used for a vinyl chloride resin. It may, for example, be a phthalic acid ester type plasticizer such as di-2-ethylhexyl phthalate, di-n-octyl phthalate, diisodecyl phthalate, dibutyl phthalate or dihexyl phthalate; a straight chain dibasic acid ester type plasticizer such as dioctyl adipate or dioctyl sebacate; a trimellitic acid ester type plasticizer; an epoxy type plasticizer such as epoxydized soybean oil, epoxydized linseed oil or a liquid epoxy resin; or a phosphoric acid ester type plasticizer such as triphenyl phosphate, trixylyl phosphate or tricresyl phosphate. These plasticizers may be used alone or in combination as a mixture.

The plasticizer serves to set the vinyl chloride resin composition at a desired hardness.

Thus, the amount of the plasticizer may vary depending upon the type and the amount of the vinyl chloride homopolymer or the acrylic resin which will be described hereinafter, or upon the presence or absence of other additives such as a filler. However, it is usually optionally selected within a range of from 20 to 200 parts by weight, preferably from 25 to 120 parts by weight, per 100 parts by weight of the vinyl chloride homopolymer.

The acrylic resin to be blended to the vinyl chloride resin composition is the one obtained by polymerizing acrylic acid or its derivative. It may, for example, be a polymer or copolymer of e.g. acrylic acid, an acrylic acid ester, acrylamide, acrylonitrile, methacrylic acid or a methacrylic acid ester.

For the composition of the present invention, it is particularly preferred to employ an acrylic resin containing at least 60 wt %, preferably from 70 to 90 wt %, of methyl methacrylate and having a weight average molecular weight of at least 1,500,000, as calculated as styrene by gel permeation chromatography (GPC).

Commercially available acrylic resins usually have a weight average molecular weight of at most 5,000,000. Among them, it is preferred to use an acrylic resin having a weight average molecular weight within a range of 1,800,000 to 3,500,000.

The amount of the acrylic resin is usually within a range of from 5 to 30 parts by weight, preferably from 5 to 20 parts by weight, more preferably from 8 to 15 parts by weight, per 100 parts by weight of the vinyl chloride homopolymer. If the amount of the acrylic resin is less than 5 parts by weight, the elongation at the time of melting and softening the composition will not be improved. On the other hand, if it exceeds 30 parts by weight, the processability for pelletizing or kneading the composition tends to be poor.

By properly selecting the molecular weight and the amount of the acrylic resin, it is possible to control the melt viscosity of the vinyl chloride resin composition and to control the maximum draft ratio to a desired level, whereby the shape-following property and maintaining property at the time of extrusion molding where the cross-sectional shape of a molded product is continuously changed, can be improved, and constant extrusion molding can be conducted without lowering the extrusion speed.

To the vinyl chloride resin composition of the present invention, various additives including a stabilizer, a filler, a lubricant, an antioxidant, a ultraviolet absorber, a foaming agent, a flame retardant, a pigment, an impact modifier, a thermoplastic resin other than the above and a rubber material, may be incorporated as the case requires.

As the thermoplastic resin and rubber material, a methyl methacrylate/butadiene/styrene copolymer (MBS), acryl rubber (AR), butadiene rubber (BR), a styrene/butadiene copolymer (SBR), an acrylonitrile/butadiene copolymer (NBR), an acrylonitrile/butadiene/styrene copolymer (ABS), isoprene rubber (IR), chloroprene rubber (CR), an ethylene/propylene copolymer (EPR), an ethylene/vinyl acetate copolymer (EVA), a thermoplastic polyurethane (TPU) and nylon, may, for example, be mentioned.

As the filler, carbon black, calcium carbonate, titanium oxide, talc, aluminum hydroxide, magnesium hydroxide, hydrotalcite, clay, silica, or white carbon powder, may, for example, be mentioned. By an addition of a proper amount, such a filler provides a function to facilitate the kneading and molding of the composition. The amount of the filler is usually within a range of at most 150 parts by weight, preferably from 5 to 100 parts by weight, per 100 parts by weight of the vinyl chloride homopolymer.

To prepare the vinyl chloride resin composition of the present invention, for example, a vinyl chloride homopolymer, a plasticizer and an acrylic resin as well as the above-mentioned various optional additives are uniformly mixed or kneaded within a temperature range where the vinyl chloride homopolymer will not deteriorate. The composition of the present invention is used usually in the form of pellets.

An apparatus to be used for mixing the above blend components, may be any apparatus so long as it is capable of uniformly mixing them. For example, it may be a Henschel mixer, a ribbon blender or a planetary mixer. To knead the mixture, an apparatus capable of kneading it under a shearing force under heating, such as an extruder, a roll mill, a Banbury mixer or a kneader, can be used. As a kneading method, it is possible to employ a method wherein by means of an extruder having a plurality of inlets, the resin component and various additives are introduced in a first stage, and a plasticizer is introduced in a subsequent stage.

The vinyl chloride resin composition of the present invention prepared as described above usually has a maximum draft ratio of at least 7, preferably from 8 to 50, more preferably from 8 to 20, whereby the property to follow the cross-sectional shape change at the time of extrusion molding which is conducted while continuously changing the molding cross-sectional shape, is excellent, and it is possible to obtain an extrusion molded product having the predetermined shape maintained.

The maximum draft ratio is a value representing the elongation at the time of melting and softening the composition, and it is a ratio of the take-off speed to the extrusion speed immediately before breakage of the filamentous composition, when the vinyl chloride resin composition is extruded from an orifice having a diameter of 1 mm and a length of 20 mm at a cylinder temperature of 170° C. at a shear rate of $1.2 \times 10^2 s^{-1}$, and the extruded filamentous composition is taken off at an increasing speed, i.e. a value represented by the ratio of the take-off speed to the extrusion speed.

The composition of the present invention is essentially designed to be used for extrusion molding where the cross-sectional shape of a molded product is continuously changed. The extrusion molding where the cross-sectional shape is continuously changed, is meant for extrusion molding as shown in the above-mentioned publications. For example, it is a molding method employing, for example, an extruder provided with an extrusion die 1 as shown in FIG. 1 (front view), which comprises a main die 2 having a resin flow opening 4 having a cross-sectional shape of the molded product and a subdie 3 movable along the opening of the main die to change the shape of the opening. In FIG. 1, the subdie 3 moves from left to right, vice versa.

The vinyl chloride resin composition of the present invention is extrusion-molded by means of the above extrusion machine while changing the shape of the extrusion die. The composition of the present invention may also be extrusion-coated on a strip or filamentous material made of a metal or a hard resin, or may be subjected to co-extrusion molding with other resins by means of a plurality of extrusion machines, wherein a plurality of resins may be joined in an extrusion die or in the vicinity of extrusion dies.

Now, the vinyl chloride resin composition of the present invention will be described in further detail with reference to Examples. However, it should be understood that the present invention is by no means restricted to such specific Examples.

Evaluation of the hardness, the maximum draft ratio and the extrusion moldability was carried out as follows.

Hardness: In accordance with JIS K6301, type A hardness, after 10 seconds.

Maximum draft ratio: Caprylograph 1B and melt strength apparatus, manufactured by Toyoseiki K. K. were used. The take-off speed of the filamentous composition extruded at a constant extrusion speed was measured by a method wherein the rotational speed of a pulley equipped with a means for controlling the number of rotations, is gradually increased.

Extrusion moldability: Using the extrusion die as shown in FIG. 1, the vinyl chloride resin composition was extruded at an extrusion speed of 5 m/min. The subdie was reciprocated at a speed of 10 mm/sec.

Molding conditions:

| Cylinder | 1 | 2 | 3 | Die |
|---|---|---|---|---|
| Temperature (°C.) | 150 | 155 | 160 | 170 |

Evaluation standards:

○: The shape-following property is good, and the shape-maintaining property is also good.

Δ: The shape-following property is slightly poor, but practically acceptable.

X: The shape-following property is poor, and the shape deforms.

EXAMPLES 1 TO 7 AND COMPARATIVE
EXAMPLES 1 TO 5

The types and amounts (parts by weight) as shown in Table 1, of a vinyl chloride homopolymer (PVC), a plasticizer (diisononyl phthalate) and an acrylic resin as identified below, and 3 parts by weight of a Ba-Zn type composite stabilizer, 1 part by weight of a phosphite type chelater, 0.3 part by weight of a lubricant, 1 part by weight of an ultraviolet absorber and 10 parts by weight of calcium carbonate, were mixed by a Henschel mixer. Then, the mixture was kneaded by a Banbury mixer until the resin temperature became 165° C., then sheeted by a mill roll and pelletized by a pelletizer. The pellets thus obtained were used as a material for evaluation.

Acrylic Resins:

| Trademarks | Manufactures | Methyl methacrylate/ alkyl acrylate (wt %) | Weight average molecular weight |
| --- | --- | --- | --- |
| A Methaburene P530 | Mitsubishi Rayon Co., Ltd. | 80 to 90/ 20 to 10 | 3,100,000 |
| B Polaroid K125 | Roam & Hars | 70 to 90/ | 2,000,000 |
| C Methaburene P551 | Mitsubishi Rayon Co., Ltd. | 80 to 90/ 20 to 10 | 1,450,000 |

TABLE 1

|  | Examples ||||||| Comparative Examples |||||
| --- | --- | --- | --- | --- | --- | --- | --- | --- | --- | --- | --- | --- |
|  | 1 | 2 | 3 | 4 | 5 | 6 | 7 | 1 | 2 | 3 | 4 | 5 |
| PVC | | | | | | | | | | | | |
| Average polymerization degree: 1300 | 100 | 100 | 100 |  | 100 | 100 | 100 | 100 | 100 | 100 | 100 | 100 |
| Average polymerization degree: 1800 |  |  |  | 100 |  |  |  |  |  |  |  |  |
| Plasticizer | 40 | 40 | 40 | 40 | 40 | 40 | 80 | 40 | 40 | 40 | 40 | 80 |
| Acrylic resin | | | | | | | | | | | | |
| A |  |  |  |  | 5 | 10 |  |  |  |  |  |  |
| B | 5 | 8 | 10 | 10 |  |  | 10 | 2 | 4 |  |  | 2 |
| C |  |  |  |  |  |  |  |  |  | 5 | 10 |  |
| Hardness | 88 | 89 | 90 | 91 | 88 | 90 | 65 | 87 | 88 | 88 | 90 | 63 |
| Maximum draft ratio | 7.6 | 11.5 | 15.1 | 14.1 | 8.3 | 18.1 | 15 | 5.2 | 6.8 | 5.9 | 6.9 | 4.9 |
| Extrusion moldability | Δ | O | O | O | O | O | O | X | X | X | X | X |

The vinyl chloride resin composition of the present invention can be made to have a desired level of hardness and has good elongation at the time of melt softening i.e. a large maximum draft ratio, whereby it is excellent in the shape-following property even when the extrusion cross-sectional shape is changed during extrusion molding, and it is possible to obtain an excellent molded product corresponding to the change of the shape.

What is claimed is:

1. A vinyl chloride resin composition to be used for extrusion molding whereby the cross-sectional shape of a molded product is continuously changed, said composition comprising 100 parts by weight of a vinyl chloride homopolymer, from 20 to 200 parts by weight of a plasticizer, and from 5 to 30 parts by weight of an acrylic resin having a weight average molecular weight of at least 1,500,000, said acrylic resin comprising 60–90 wt % methyl methacrylate and 40–10 wt % of alkyl acrylate or a mixture of alkyl acrylate with a comonomer selected from the group consisting of acrylic acid, acrylamide, acrylonitrile, methacrylic acid and a methacrylic acid ester other than methyl methacrylate, and wherein said composition has a maximum draft ratio of at least 7.

2. The vinyl chloride resin composition according to claim 1, wherein the weight average molecular weight of the acrylic resin is within a range of from 1,800,000 to 3,500,000.

3. The vinyl chloride resin composition according to claim 1, wherein the methyl methacrylate content of the acrylic resin is within a range of from 70 to 90 wt %.

4. The vinyl chloride resin composition according to claim 1, wherein the amount of the acrylic resin is within a range of from 5 to 20 parts by weight per 100 parts by weight of the vinyl chloride homopolymer.

5. The vinyl chloride resin composition according to claim 1, wherein the maximum draft ratio is within a range of from 8 to 50.

6. The vinyl chloride resin composition according to claim 1, which contains a filler.

7. The vinyl chloride resin composition according to claims 6, wherein the amount of the filler is within a range of from 5 to 150 parts by weight per 100 parts by weight of the vinyl chloride homopolymer.

* * * * *